US012267690B2

(12) United States Patent
Zufall et al.

(10) Patent No.: US 12,267,690 B2
(45) Date of Patent: Apr. 1, 2025

(54) METHOD AND SYSTEM FOR INTERFACE MANAGEMENT FOR NEIGHBORING ENTERPRISE NETWORKS

(71) Applicant: DISH Wireless L.L.C., Englewood, CO (US)

(72) Inventors: David Zufall, Lone Tree, CO (US); Mehdi Alasti, Reston, VA (US); Siddhartha Chenumolu, Ashburn, VA (US)

(73) Assignee: DISH Wireless L.L.C., Englewood, CO (US)

( * ) Notice: Subject to any disclaimer, the term of this patent is extended or adjusted under 35 U.S.C. 154(b) by 578 days.

(21) Appl. No.: 17/647,369

(22) Filed: Jan. 7, 2022

(65) Prior Publication Data
US 2023/0224716 A1 Jul. 13, 2023

(51) Int. Cl.
| | |
|---|---|
| *H04W 16/14* | (2009.01) |
| *H04W 28/08* | (2023.01) |
| *H04W 56/00* | (2009.01) |
| *H04W 72/20* | (2023.01) |
| *H04W 92/02* | (2009.01) |

(52) U.S. Cl.
CPC ....... *H04W 16/14* (2013.01); *H04W 28/0846* (2020.05); *H04W 56/001* (2013.01); *H04W 72/20* (2023.01); *H04W 92/02* (2013.01)

(58) Field of Classification Search
CPC ..... H04W 72/20; H04W 92/02; H04W 24/10; H04J 11/0023; H04J 11/0056; H04L 43/0876
See application file for complete search history.

(56) References Cited

U.S. PATENT DOCUMENTS

2017/0331670 A1* 11/2017 Parkvall ............ H04W 52/0229
2019/0394790 A1* 12/2019 Damnjanovic ..... H04W 74/085
(Continued)

FOREIGN PATENT DOCUMENTS

| EP | 2858400 A1 | 4/2015 |
|---|---|---|
| WO | WO-2021090101 A1 * | 5/2021 |

(Continued)

OTHER PUBLICATIONS

PCT International Search Report for International Application No. PCT/US2023/060249 dated Jun. 9, 2023 (4 pages).
(Continued)

*Primary Examiner* — Chi H Pham
*Assistant Examiner* — Vladislav Y Agureyev
(74) *Attorney, Agent, or Firm* — KW Law, LLP

(57) ABSTRACT

A system and method for managing interference between different enterprises operating over the same spectrum. The system includes a central unit of a first enterprise associated with a first cell site; a central unit of a second enterprise associated with a second cell site; and an interface for connecting the central unit of the first enterprise to the central unit of the second enterprise and configured to transmit load information; wherein a central unit of either enterprise is configured to share load information without requiring a standard form between each enterprise via the interface to minimize interference between each enterprise when both enterprises are operating in the same spectrum and an overlapping coverage region between each cell site.

16 Claims, 7 Drawing Sheets

(56) References Cited

U.S. PATENT DOCUMENTS

| | | | |
|---|---|---|---|
| 2020/0228993 A1* | 7/2020 | Gunasekara | H04W 16/14 |
| 2020/0252808 A1* | 8/2020 | Zhao | H04W 16/10 |
| 2021/0037444 A1* | 2/2021 | Harel | H04W 16/14 |
| 2021/0068115 A1* | 3/2021 | Gotoh | H04W 72/0453 |
| 2021/0084658 A1* | 3/2021 | Sheriff | H04W 76/10 |
| 2021/0099886 A1* | 4/2021 | Taneja | H04L 5/0073 |
| 2021/0143893 A1* | 5/2021 | Taneja | H04W 28/26 |
| 2021/0175992 A1* | 6/2021 | Yavuz | H04W 24/10 |
| 2021/0329475 A1* | 10/2021 | Bedekar | H04W 88/08 |
| 2021/0389474 A1* | 12/2021 | Hamzeh | H04W 16/14 |
| 2022/0070922 A1* | 3/2022 | Talarico | H04W 74/0808 |
| 2022/0131725 A1* | 4/2022 | Li | H04L 5/0092 |
| 2022/0166459 A1* | 5/2022 | Kakinada | H04B 1/7176 |
| 2022/0167176 A1* | 5/2022 | Khalid | H04W 72/0453 |
| 2022/0201746 A1* | 6/2022 | Kwak | H04L 1/0013 |
| 2022/0322175 A1* | 10/2022 | Liu | H04W 28/0861 |
| 2022/0330032 A1* | 10/2022 | Khalid | H04W 16/28 |
| 2023/0246724 A1* | 8/2023 | Pateromichelakis | H04W 72/0453 370/329 |
| 2023/0413252 A1* | 12/2023 | Lee | H04W 72/21 |

FOREIGN PATENT DOCUMENTS

| | | | | |
|---|---|---|---|---|
| WO | WO-2021249637 A1 | * | 12/2021 | G06N 20/00 |
| WO | WO-2022043742 A1 | * | 3/2022 | H04L 5/0035 |

OTHER PUBLICATIONS

Written Opinion of the International Searching Committee for International Application No. PCT/US2023/060249 dated Jun. 9, 2023 (7 pages).

ATIS. "Neutral Host Solutions for 5G Multi-Operator Deployments in Managed Spaces," dated Jul. 25, 2019. Retrieved on Nov. 2, 2021 from the Internet <https://access.atis.org/apps/group-public/download.php/48403/ATIS-I-0000073.pdf> (49 pages).

Zarrar et al. "Definition of connectivity and QoE/QoS management mechanisms intermediate report—5G Norma D5.1 Deliverable," dated Nov. 30, 2016. Retrieved on Feb. 23, 2017 from the Internet <https://5gnorma.5g-ppp.eu/wp-content/uploads/2016/12/5g_norma_d5-1.pdf> (189 pages).

Sallent et al. "Multi-tenant mobility control in Small Cells as a Service," dated Sep. 20, 2016. Retrieved on Oct. 19, 2016 from <DOI:.10.1109/ISWCS.2016.7600930> (7 pages).

* cited by examiner

METHOD AND SYSTEM FOR INTERFACE MANAGEMENT FOR NEIGHBORING ENTERPRISE NETWORKS

CROSS-REFERENCE TO RELATED APPLICATION

The subject matter described here is related to the subject matter described in related U.S. patent application Ser. No. 17/647,368, entitled METHOD AND SYSTEM FOR RELAYING LOAD INFORMATION BETWEEN NEIGHBORING ENTERPRISE NETWORKS filed concurrently herewith.

TECHNICAL FIELD

The following discussion generally relates to interference management in wireless communications systems. More particularly, the following discussion relates to systems and processes for managing interference caused by at least wireless interference in overlapping regions of neighboring enterprise networks that are communicating over the same spectrum.

BACKGROUND

The 5G network is the fifth generation technology standard for broadband cellular networks, which cellular phone companies began deploying worldwide recently, and is the planned successor to the 4G networks to provide connectivity. The 5G data standard and telephone networks were developed to provide greatly improved bandwidth and quality of service to mobile telephones, computers, internet-of-things (IoT) devices, and the like.

The 5G systems, which support new types of services including mission-critical applications with Ultra-Reliable Low-Latency Communications (URLLC) with stringent requirements for transmitting a packet over the radio interface of very high rates of success coupled with very low latency. With URLLC, new applications such as wireless industry automation, vehicle-to-everything communication (V2X), and remote tactile control may be implemented.

Supporting URLLC is particularly relevant for many manufacturing industry applications, such as motion control, control-to-control applications, and factory automation which require the exchange of information between sensors, actuators, and central units through an industrial sensor and control network. 5G has the potential to provide the connectivity required to digitalize factories and to support data-intensive services while guaranteeing low latency and reliable connections User Equipment (UEs) transmitting to the same cellular base station can interfere with each other if the transmissions overlap, i.e., intra-cell interference. Besides, overlapping transmission from neighbor cells generates inter-cell interference. Other factors affecting the user signal quality are time-variant and frequency selective fading, limited power for compensating propagation losses, and noise in the receiver. The reliable decoding of a user's message depends directly on the resulting received signal quality.

In the 5G network, Inter-cell Interference coordination (ICIC) is an interface in the 3rd Generation Partnership Project's (3GPP's) Long Term Evolution (LTE) standardization that enables schemes based on cell-wise usage restrictions or resource preferences. Further, as the traffic network increases in the case of different enterprises operating in the same spectrum, the allocation of spectrum resources is an issue between different enterprises and between premium and non-premium subscribers which requires managing or apportioning requests based on available bandwidth.

The host or neutral host in an organization that can be the infrastructure owner that deploys and manages cell sites while leasing out slices of network capacity to different 5G service providers or enterprises (guests). The host or network operator (NOP) is in charge of orchestrating resources for multiple virtualized infrastructures or aggregated virtualized infrastructure services that are offered to various enterprises (or guests). In this instance, the enterprises are service providers (SPs) offering services to customers such as enhanced mobile broadband and IoT in various vertical industries or Network Slice configuration with services that are supported by resources provided by the host. For example, an enterprise uses various orchestrated resources of a virtualized infrastructure orchestrated where the guest (i.e., the enterprise or guest operator) may own the orchestrator and that may include network slice configurations of computing resources or networking for mobile transport. For multiple mobile network instances on a shared infrastructure, a continuous reconciliation of service level agreements (SLAs) of enterprise customers with infrastructure-level network performance capabilities is provided by the host.

Further, the Service Level Agreements (SLAs) between the different enterprise customers and host may require the Quality of Service (QoS) to be provided differently even when operating on the same assigned frequency in a region of overlap.

It is desired to provide solutions to manage multiple different enterprises operating in neighboring localities at the same frequency, particularly in instances of interference in overlapping coverage regions between the different enterprises, and for the interferences between the enterprises to be managed by a host while enabling either an agnostic relationship or interactive relationship between the different enterprises in which enterprises may share load information for coordinating resources.

Furthermore, other desirable features and characteristics of the present invention will become apparent from the subsequent detailed description and the appended claims, taken in conjunction with the accompanying drawings and the foregoing technical field and background.

DESCRIPTION OF THE DRAWINGS

The exemplary embodiments will hereinafter be described in conjunction with the following drawing figures, wherein like numerals denote like elements, and wherein.

BRIEF SUMMARY

Figure 1:
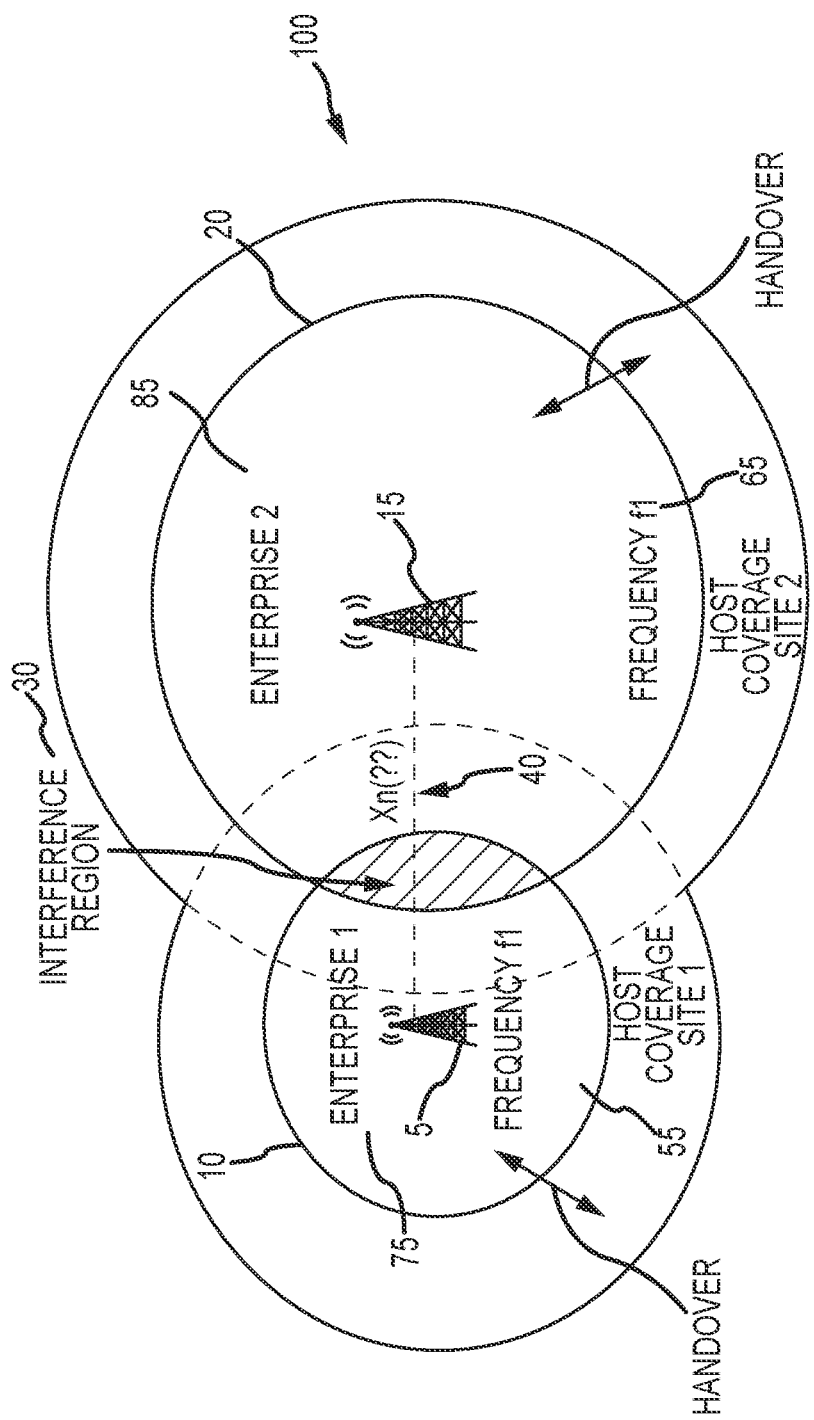
FIG. 1 illustrates an exemplary diagram of two neighboring New Radio (NR) cell sites where interference can occur at the cell edges or overlapping regions of coverage requiring management for minimizing the interference between the different enterprises operating in the same spectrum by the interference management system in accordance with various embodiments.

Systems and processes are provided to minimize interference of multiple enterprises that are each operating at neighboring NR cell sites in regions of overlapping coverage of the NR cell sites where interference is caused by transmissions from the different enterprises in the same spectrum.

In an exemplary embodiment, a method of managing interference between different enterprises operating over the same spectrum is provided. The method includes establishing a connection between a control unit of a first enterprise and the control unit of a second enterprise via an interface for coordinating communication activity between each enterprise operating in the same spectrum wherein the first enterprise is associated with a first New Radio (NR) cell site and the second enterprise is associated with a second NR cell site wherein the first NR cell site is neighboring the second NR cell site with an overlapping coverage region between each NR cell site; coordinating transmissions between the first and second enterprises based on load information transmitted via the interface between the first and second enterprises when both the first and second enterprises are operating in an overlapping coverage region of neighboring NR cell sites in the same spectrum; and configuring the interface to enable transmission of only load information between each of the enterprises wherein transmission of the load information does not require any standard format in order for processing by the control unit of either enterprise.

In at least one exemplary embodiment, the method further includes minimizing interference, by the first and second enterprises, based on the load information which is transmitted between both enterprises via the interface by coordinating transmissions from a group of User Equipment (UE) associated with each of the enterprises operating in the overlapping coverage region of neighboring NR cell sites in accordance with a bandwidth that is allocated to each enterprise.

In at least one exemplary embodiment, the method further includes configuring another interface for coupling a central unit at a host to the central unit of the first enterprise, and to the central unit of the second enterprise wherein, each enterprise is separately coupled wherein the other interface is configured to transmit mobility information.

In at least one exemplary embodiment, the method further includes configuring the connection of a Service Assurance (SA) unit coupled to the central unit wherein the SA unit assists in the delivery of information from service level agreements SLAs with respective enterprises to the central unit of the host.

In at least one exemplary embodiment, the method further includes communicating, by the central unit of the host via the other interface, information from the SLA to the central unit of each enterprise to assist each enterprise in coordinating transmissions of a group of UE associated with each enterprise to minimize interference by synchronizing uplink and downlink transmissions of the group of UE that is operating in the same spectrum in the overlapping region.

In at least one exemplary embodiment, the method further includes allocating the bandwidth, by the central unit of the host, based on at least information from the SLA with a respective enterprise and the mobility information received via the other interface.

In at least one exemplary embodiment, the method further includes wherein the central unit of each enterprise ensures that any overlap in requests by each enterprise for reserved grant-free resources by each enterprise is minimized.

In at least one exemplary embodiment, the method further includes wherein each dedicated group of UE is notified of the use of reserved grant-free resources via grant messages exchanged between each enterprise via the interface.

In at least one exemplary embodiment, the method further includes wherein grant free access configured with each enterprise enables any type of traffic including Ultra-Reliable and Low-Latency Communications (URLLC) at the NR cell site for the dedicated group of UE of each enterprise.

In at least one exemplary embodiment, the method further includes supporting the URLLC for the uplink and downlink transmissions by the central unit of the first enterprise and by the central unit of the second enterprise by coordinating allocated non-overlapping grant-free resources of an Industrial Internet of Things (IIOT) device operating in an interference region.

In at least one exemplary embodiment, the method further includes supporting, by the central unit configured at either enterprise, the URLLC for the uplink transmission only by the first enterprise and the second enterprise any time the IIoT device sends a packet by immediately transmitting the packet over an allocated grant-free resource with a boosted power.

In at least one exemplary embodiment, the method further includes wherein each enterprise central unit is connected to a set of distributed units to manage requests from the group of UE operating on parts of the bandwidth in the same spectrum which is allocated to either enterprise of neighboring NR cell sites wherein the bandwidth used by the group of UE of either enterprise at the neighboring NR cell site is managed by the load information received by a host central unit.

In another exemplary embodiment, a system for managing interference between different enterprises operating over the same spectrum is provided. The system includes a central unit of a first enterprise associated with a first cell site; a central unit of a second enterprise associated with a second cell site; and an interface for connecting the central unit of the first enterprise to the central unit of the second enterprise and configured to transmit load information; wherein a central unit of either enterprise is configured to share load information without requiring a standard form between each enterprise via the interface to minimize interference between each enterprise when both enterprises are operating in the same spectrum and an overlapping coverage region between each cell site.

In at least one exemplary embodiment, the system further includes wherein the central unit of each enterprise is configured to coordinate uplink and downlink transmission requests between a group of User Equipment (UE) of each enterprise subscriber operating in the overlapping coverage region between each cell site to reduce frequency interference that occurs in the same spectrum.

In at least one exemplary embodiment, the system further includes wherein the central unit of each enterprise unit is configured to coordinate requests between each enterprise based on requirements received from a Service Assurance (SA) unit coupled to the central unit of a host in communication with each enterprise wherein the SA unit assists in the delivery of SLAs to the central unit of the host.

In at least one exemplary embodiment, the system further includes wherein the central unit of each enterprise is configured to support traffic that includes at least URLLC for transmissions by the first enterprise and the second enterprise with allocated resources of an Industrial Internet of Things (IIOT) device when operating in an interference region.

In at least one exemplary embodiment, the system further includes wherein the central unit of each enterprise is configured to support traffic that includes at least the URLLC for the transmissions by the first enterprise and the second enterprise any time the IIoT device sends a packet by an immediate transmission of the packet over the allocated resource with a boosted power.

In at least one exemplary embodiment, the system further includes wherein the central unit of each enterprise is connected to a respective distributed unit for controlling the group of UE operating on a bandwidth in the same spectrum which is allocated to either enterprise at the NR cell site wherein the bandwidth used by the group of UE of either enterprise at the NR cell site is managed by the central unit of the host.

In yet another exemplary embodiment, a system synchronizing radio transmissions of enterprises of neighboring cell sites operating in the same spectrum to minimize interference between the enterprises is provided. The system includes a central unit configured at a host that manages resources of multiple cell sites; a first central unit configured at a first enterprise network; a second central unit configured at a second enterprise network; a pair of interfaces including a first interface configured to connect directly together central units of each enterprise, and a second interface configured to connect the central unit of the host to the central unit of each enterprise; wherein the first interface is only configured to share load information between the central unit of each enterprise that is used to minimize interference of transmissions between enterprises operating in the same spectrum and an interference region.

In at least one exemplary embodiment, the system further includes wherein the central unit of each enterprise unit is configured to coordinate requests between each enterprise based on requirements received from a Service Assurance (SA) unit coupled to the central unit of the host in communication with each enterprise wherein the SA unit assists in the delivery of SLAs to the central unit of the host.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

Wireless mobile communication technology uses various standards and protocols to transmit data between a base transceiver station (BTS) and a wireless mobile device. In 3GPP radio access networks (RANs) in LTE systems, the BTS can be a combination of evolved Node Bs (also commonly denoted as enhanced Node Bs, eNodeBs, or eNBs) and Radio Network Central units (RNCs) in a Universal Terrestrial Radio Access Network (UTRAN), which communicates with the wireless mobile device, known as user equipment (UE). A downlink (DL) transmission can be a communication from the BTS (or eNodeB) to the wireless mobile device (or UE), and an uplink (UL) transmission can be a communication from the wireless mobile device to the BTS.

5G has introduced changes to support URLLC at the Radio Access Network (RAN) level since the medium access mechanisms account for an important part of the total end-to-end transmission delay. This is for example the case of the grant-based scheduling process for uplink (UL)/downlink (DL) transmissions in legacy LTE (Long Term Evolution) 4G networks. Grant-based scheduling requires User Equipment (UE) and a Base Station (BS) to exchange scheduling requests (SRs) and grant messages before transmitting any data.

The ICIC is defined in 3GPP release 8 as an interference coordination technology used in LTE systems. It reduces inter-cell interference by having UEs, at the same cell edge but belonging to different cells, using different frequency resources. Base stations that support this feature can generate interference information for each frequency resource (RB) and exchange the information with neighbor base stations through X2 messages. Then, from the messages, the neighbor stations can learn the interference status of their neighbors, and allocate radio resources (frequency, Tx power, etc.) to their UEs in a way that would avoid inter-cell interference The base stations can also cooperate in many ways for improving the system performance. For example, they can apply interference management for all services (including for litra-roliable, low latency communications (URLLC)) by exploiting macro-diversity with joint reception of the uplink and downlink signals.

Enhanced Inter-Cell Interference Coordination (eICIC) enables an interference control in LTE-A. The eICIC scheme focuses on the time domain solution to reduce interference. Networks consisting of the same type of cells are generally referred to as homogeneous networks while ones with different types of cells are referred to as heterogeneous networks (HetNet). The HetNet is also a network where small cells are deployed within macro cell coverage.

Grant-free transmission schemes achieve better performance than grant-based since the delay and error-prone scheduling procedure is avoided. Resource sharing can improve the resource efficiency of the system when the channel is used sporadically. With the use of short transmission time intervals (TTIs), the target reliability can be achieved aided by repetitions or reactive retransmissions schemes. And the use of robust Modulation and Coding Scheme (MCS), and multi-user detection receiver with interference rejection capability can achieve the stringent requirements.

For deterministic traffic, the base station can assign the resources to the UE in accordance with its traffic pattern. In this case, the base station knows exactly when transmission occurs. While for sporadic traffic, the base station should configure the resources allowing the UE to transmit whenever a packet arrives in the transmission buffer. And if the UE has no data to transmit it will not use the configured resource.

The base station can allocate either dedicated resources per UE or shared resources per group of UEs. The 5G NR standard introduces the use of grant-free scheduling (also referred to as Configured Grant). With grant-free scheduling, the network pre-configures the radio resources and assigns them to UEs without waiting for UEs to request resources. UEs can utilize the pre-assigned resources as soon as they have data to transmit. This is in contrast to grant-based scheduling, where UEs must request access to radio resources through the transmission of Scheduling Requests (SR). The base station (BS) assigns the radio resources to the UEs and notifies them using grant messages. UEs must wait to receive these grant messages before transmitting any data. Grant-free scheduling eliminates all delays introduced by the handshaking present in grant-based scheduling. Grant-free scheduling also improves the energy consumption of the UEs, reduces their complexity, and decreases the signaling overhead compared with grant-based scheduling. Grant-free scheduling can assign dedicated or shared resources to the UEs. The BS decides whether resources are dedicated to specific UEs or are shared by a group of UEs.

Network synchronization is also required for optimal radio network performance. While there is no change to fundamental synchronization requirements in the move from 4G to 5G, wider use of TDD radio technology and growing demand for new network architectures that support demanding 5G use cases have made the need for time synchronization more critical in 5G. Industrial automation is just one example of a use case that requires accurate timing and is likely to generate additional synchronization requirements.

In reference to FIG. 1, FIG. 1 illustrates an exemplary diagram of a pair of neighbor New Radio (NR) cell sites with an overlapping coverage region that causes interference between transmissions of different enterprises that operate at each NR cell site in the same spectrum which is managed by an inter-cell interference system in accordance with various embodiments. In FIG. 1, the exemplary 5G network 100 consists of a wireless radio access network (RAN), which includes a set of neighboring Base Stations/g-NodeBs (gNBs) of NR cell sites (10, 20) where the NR cell site 10 is associated with the coverage area where "enterprise 1" 75 is operating. Adjacent to the NR cell site 10, is a neighboring NR cell site 20 that transmits with a coverage area that is associated with "Enterprise 2" 85.

The ICIC information is coordinated between base stations of each cell site, by linking the base stations (5, 15) via the interface "X(n)" 40. Interface 40 allows each base station to coordinate information in the overlap region 30 (i.e., the interference region). For example, the interference can be mitigated in the overlap region 30 by using the ICIC information to coordinate transmissions of subframes in the time domain of requests from UEs associated with each base station. In other words, there is no interference in those subframes from the macro cell so data transmissions can be much faster.

For example, the base station's central unit can increase or decrease the number of subframes that are assigned for use by either enterprise to increase the NR cell site capacity based on the number of UEs. In other embodiments, the intra-cell power control (i.e., devices of the same enterprise) can use techniques such as power-boosting in an uplink transmission which allows a UE to transmit with a higher power level so the base station will receive the signal even with overlap.

Further, in instances, the power levels can be changed by the base station of the transmission signals in the overlap region 30 by lowering the power in parts of the subchannels in the frequency domain reducing the coverage areas of each base station and the overlap region 30 so that uplink and downlink transmissions from the UEs are received close to the base station of each enterprise. This can prevent the subchannels of "Enterprise 1", in this case, from interfering with the same subchannels used in neighboring cells associated with "Enterprise 2", allowing data to be sent faster on those subchannels to UE that are close to the base station 15 of the NR cell site.

Figure 2:
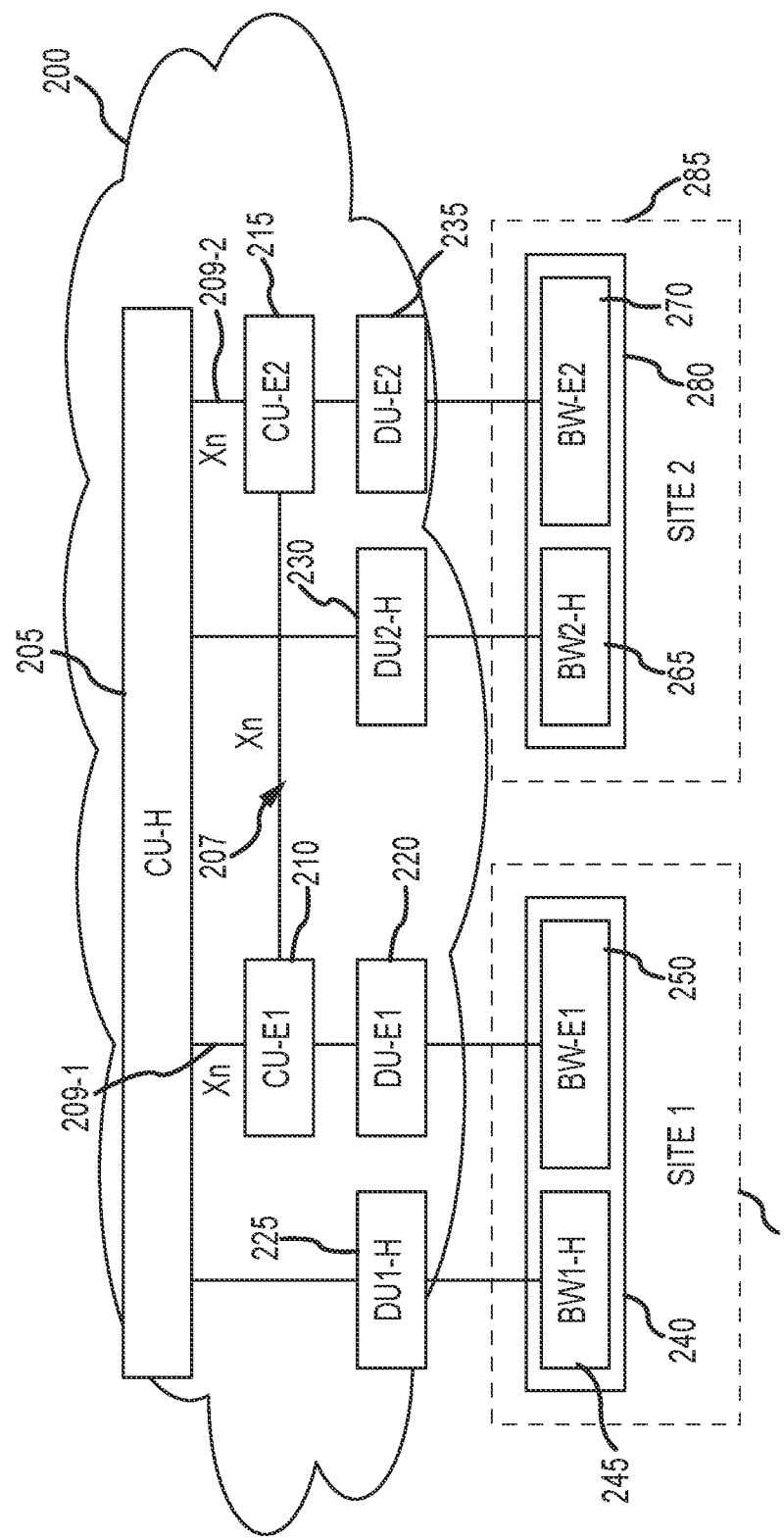
FIG. 2 illustrates an exemplary diagram of an interface between central units of a pair of enterprise of neighboring cell sites operating in the same spectrum where information is shared to minimize inference in overlapping coverage areas between the cell sites by the interference management system, in accordance with various embodiments.

FIG. 2 illustrates a diagram of the interface between central units of a pair of enterprise of neighboring cell sites operating in the same spectrum where information is shared to minimize inference in overlapping coverage areas between the cell sites, in accordance with various embodiments. In FIG. 2, there is shown a central unit of the host (CU-H) 205 which is located or integrated with a host (i.e., embedded in a host layer). The CU-H 205 of the host includes a central unit with software that manages cell site 5G radios attached or linked to it, and the connections to the mobile core, and cooperation with local enterprises that create the 5G services with it.

The 5G BTS or gNB is generally divided into three physical entities of the radio unit (RU), the central unit (CU), and the distributed unit (DU). In FIG. 2, there is shown the CU-H 205 (Central Unit) of the host, and the DU-H 225 (Distributed Unit) of the host. There is a radio unit (RU) (not shown) associated with "site 1" 260, and a radio unit (RU) (also not shown) associated with "site 2" 285. The CU-H 205 of the host provides support for the higher Physical layers (PHY) of the protocol stack such as SDAP, PDCP, and RRC while DU-H 225 includes the higher PHY and also provides support for the lower layers of the protocol stack of the radio unit (RU) such as RLC, MAC, and Physical layer.

The software of CU-H 205 is hosted onsite at an enterprise data center server or an operator-provided edge compute server. The CU-H 205 is connected by separate connections to a pair of central units (CUs) of each enterprise (i.e., Enterprises 1 and 2). For example, central unit (CU-E1) 210 of "enterprise 1" is connected directly to CU-H 205 to receive instructions on how to coordinate communications in the coverage area of enterprise 1. The other central unit, the central unit (CU-E2) 215 of "enterprise 2" is connected directly to the central unit of the host, CU-H 205, to receive instructions on how to coordinate communications in the coverage area of enterprise 2. The interface $X_n$ 207 connects both of the central units, CU-E1 210 and CU-E2 215 directly and is configured to share load information. For example, the interface $X_n$ 207 can be used for sharing ICIC (or eICIC) information between the enterprises and not for coordinating handovers between cell sites (i.e., sharing mobility information). Also, there is no standardization in interface configurations to implement the sharing of the ICIC information using the interface.

In embodiments, the CU-H 205 receives mobility information via interfaces $X_n$ 209-1, 209-2 from the respective central units, CU-E1 210 and CU-E2 215. In instances, the CU-H 205 may assist in managing the interference in overlapping regions of coverage between the base stations with the CUs of the respective enterprises. For example, the CU-H 205 may receive SLA information to coordinate transmission between enterprises in overlapping regions of coverages.

In embodiments, the interference can be between macro and picocells of both enterprises, where multiple picocells connect to each base station. The CU-H 205 of the host (i.e., host MNO) also manage resources used by the base station and hand-over functions to prevent interference that affects communications between multiple radio transmissions in overlapping regions, especially uplink and downlink transmission between UEs with services of each enterprise associated with neighboring base stations operating in the overlapping region.

The CU-E1 210 of the "enterprise 1" is connected to distributed unit DU-E1 220 which can be linked to a group of UEs operating in the managed or allocated bandwidth BW-E1 250 for "enterprise 1". The DU1-H 225 of the host is used to manage part of the bandwidth (BW1-H and BW-E1) 240 for the base station of the cell site "1" 260 allocated to the host, which is defined as the host bandwidth BW1-H 245. The DU2-H 230 of the host manages the bandwidth BW2-H 265 of the host (BW2-H) and the DU-E2 235 of "enterprise 2" manages the bandwidth 270 (BW-E2) allocated for "enterprise 2" of the total bandwidth (BW2-H and BW-E2) 280 of the cell site "2" 285 that is associated with "enterprise 2". In this configuration, to manage the synchronization of the transmissions between the enterprises, the interface $X_n$ 207 enables both of the enterprises to share the load information between them. The host Mobile Network Operator (MNO) has no visibility or control over the interference for any optimizations.

In exemplary embodiments, the interface $X_n$ 209-1 can be configured to share not only mobility information but other information from "enterprise 1"; for example, to share ICIC information with the CU-H 205 of the host. Likewise, the interface $X_n$ 209-2 may also be similarly configured for "enterprise 2" to share ICIC information if desired with the CU-H 205 of the host, rather than simply mobility information. In embodiments, the CU-H 205 of the host may be configured to implement various intelligent solutions based on SLA information, ICIC (or eICIC) information (i.e., the load information), priority information, resource allocation, etc., as desired and shared by each enterprise. For example, a central unit of the CU-H 205 may be programmed to reduce interference between the enterprises by allocating limited or constraint resources to each enterprise in the neighboring NR cell sites in a way that the allocated or constraint resources (i.e., resource blocks used by UEs of the respective enterprise) do not overlap. In another embodiment, the CU-H 205 may be programmed to coordinate transmissions to reduce interference between the enterprises by at a serving cell, stopping transmitting at a certain subframe so that other cells can transmit the signal during that period.

In embodiments, the control unit CU-E1 210 of enterprise 1 can exchange load information using the interface $X_n$ 207 that is configured to send and receive load information (as opposed to only being enabled to send and receive mobility information) with the control unit CU-E2 215 of the other enterprise, enterprise 2, when both enterprises are operating in an interference region and require coordination of communication activities to reduce interference. In embodiments, both enterprises can receive information via interfaces 209-1, 209-2 respectively from the control unit CU-H 205 of the host about the mobility of UEs of either enterprise operating in the interference region to coordinate transmission activities to reduce interference. In embodiments, either enterprise via the respective interface may also receive information of allocated resources and available bandwidth in the overlapping regions or at the respective cell site (i.e., the base station operations of the respective cell site of each enterprise are managed by the host control unit CU-H 205). Hence, in this operation, the host MNO has no control over the coordination of transmissions of either enterprise and is limited to an ancillary role to provide mobility information or the like. The operations of either enterprise are independently coordinated by control units of either enterprise. The interface $X_n$ 207 does not provide mobility or handover information between each enterprise, and this is monitored by the host control unit CU-H 205. In this manner, the type of information is segregated that is between the host/enterprises and the enterprise to enterprise exchange. The interface $X_n$ 207 is used only for ICIC or eICIC information flow as requested by either enterprise to coordinate independent transmissions in the interference region.

Figure 3:
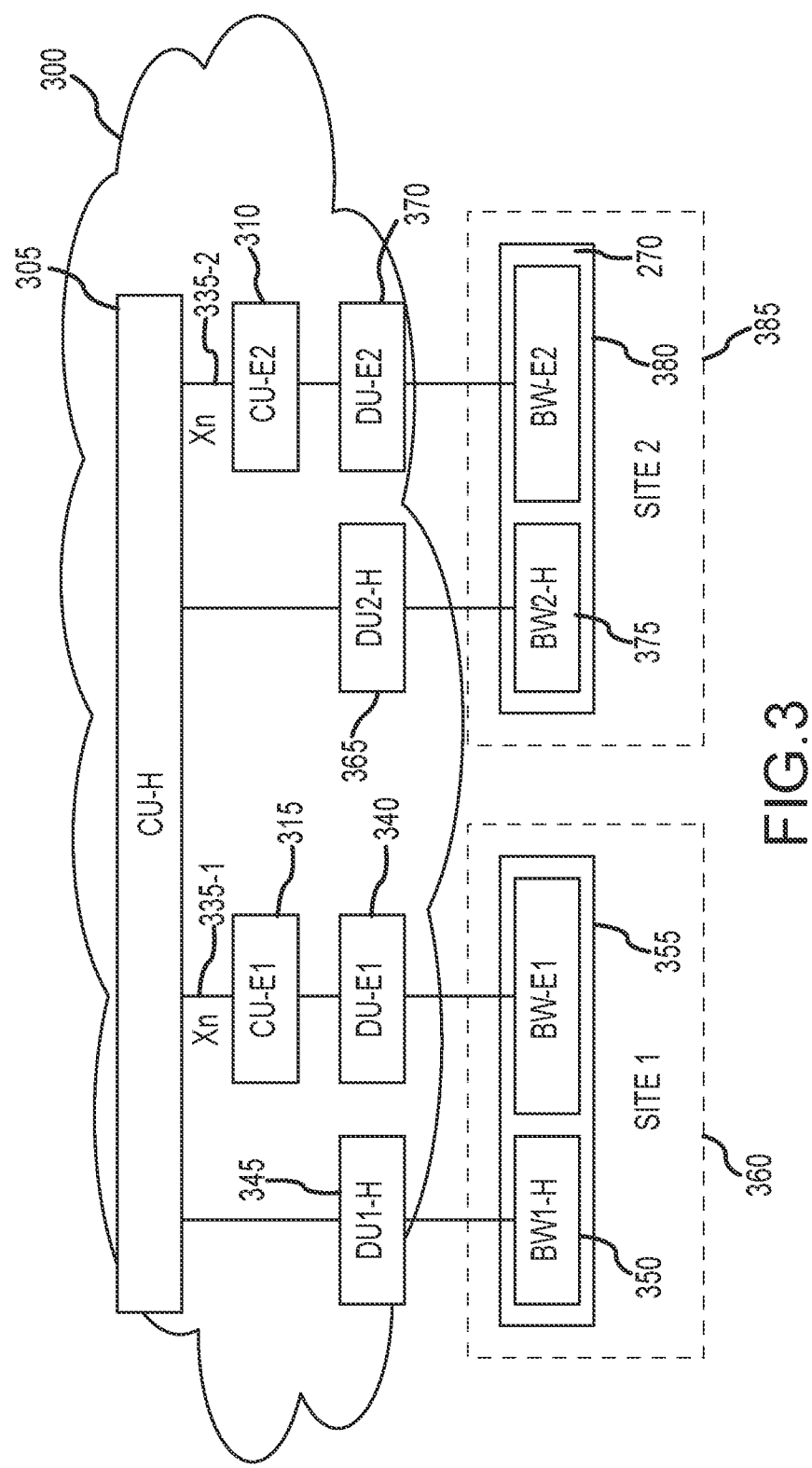
FIG. 3 illustrates an exemplary diagram of the host mobile network operator controlling the Inter-cell Interference (ICIC) information between the enterprises of neighboring New Radio (NR) cell sites by the interference management system in accordance with various embodiments.

FIG. 3 illustrates a diagram of the host mobile network operator controlling the ICIC information between the enterprises of the interference management system in accordance with various embodiments. In FIG. 3, the ICIC information between enterprises (E1 and E2) is carried through CU-H 305 of the host and the $X_n$ interfaces 335-1, 335-2 connecting the host to each central unit CU of each enterprise (i.e., central unit CU-E1 315 of enterprise 1 and central unit CU-E2 310 of enterprise 2). In an embodiment, in this configuration, the host mobile network operator (MNO) has complete visibility to the interference and may implement various intelligent algorithmic processes (e.g., ML/AI, Game Theory) for performance optimization. Without the connection between the enterprises (i.e., "enterprises 1 and 2") have no visibility as to each other's operating modes in the overlapping regions of coverage. Also, the coordination by the central unit CU-H 305 of the host may require some standardizations (for sharing the intercell interference coordination (ICIC) information by the central unit CU-H 305 of the host to each enterprise).

FIG. 3 shows a similar architecture as in FIG. 2 of the CU-E1 315 of "enterprise 1" coupled to its own DU-E1 340 for allocating the bandwidth BW-E1 355 of "enterprise 1" with the CU-H 305 coupled to the DU1-H 345 of the host for "enterprise 1" for allocating the bandwidth BW1-H 350 of the host of the total available bandwidth (BW1-H and BW-E1) for NR cell site "1" 360. Similarly, CU-E2 310 of "enterprise 2" is coupled to its own DU-E2 370 for allocating the bandwidth BW-E2 380 of "enterprise 2" with the CU-H 305 coupled to the DU2-H 365 of the host for "enterprise 2" for allocating the bandwidth BW2-H 375 of the host of the total available bandwidth for NR cell site "2" 385.

In an exemplary embodiment, as an example, assuming that neighboring private networks (enterprises) leased RU and spectrum from a host MNO. The host MNO (i.e., CU-H 305) owns the spectrum and RUs and each enterprise leases the spectrum and RU while retaining control (or owns) its respective DU and CU. As shown in FIG. 3, "enterprise 1" leases the bandwidth BW-E1 355 of "enterprise 1" for the locality of the "cell site 1" 360, and the "enterprise 2" leases the bandwidth BW-E2 380 for the locality of the "cell site 2" 385.

In embodiments, all the virtualized DUs and CUs (of the host, and enterprises) are located at a cloud server, and the $X_n$ interface between the host CU and "enterprise 1" CU, and the interfaces of the host CU between Host CU and the "enterprise 2" CU share load information.

In embodiments, in FIG. 3, the CU-H 305 of the host is configured with a central unit (with a processor disposed) that is configured with instructions to mitigate interference between the neighboring NR cell sites (and several picocells in the coverage area) based on eICIC information that coordinates subframes in the time domain used in transmission (i.e., synchronizes transmissions based on blacking of subframes between the enterprises in the overlapping region) of the different enterprises operating in the same spectrum.

In embodiments, in FIG. 3, the control unit CU-H 305 of the host operates in two modes that include a mode where the control unit CU-H 305 acts as a proxy to relay information between the control units of enterprise 1 and enterprise 2. In this example, the control unit CU-E1 315 of enterprise 1 is coupled by the interface $X_n$ 335-1 which is configured to send and receive load information to the control unit CU-H 305 of the host. The CU-E2 310 is likewise coupled by the interface $X_n$ 335-2 which is configured to send and receive load information to the control unit CU-H 305. The CU-E1 exchanges load information with the control unit CU-E2 and vice versa, by using the control unit CU-H 305 as an intermediatory or proxy to relay load information between each other. In other words, the control unit CU-H 305 enables both enterprise control units that are independently siloed to communicate with each other and coordinate transmissions when operating in a region of interference (i.e., a region of overlapping cell site coverages between each enterprise). The control unit CU-E1 is configured to send and receive via the control unit CU-H 305 load information (and the like) with the control unit CU-E2 310 of enterprise 2 to minimize interference with the other enterprise (i.e., enterprise 2) when operating in the same spectrum and in an overlapping coverage region between neighboring cell sites that are linked to either enterprise.

In another exemplary embodiment, the central unit CU-H 305 of the host is configured to act as an arbitrator. In this instance, the central unit CU-H 305 receives transmission requests from the respective enterprise (i.e., the control units of enterprise 1 and 2) when UEs are operating in the overlapping coverage region in the same spectrum; and based on information from service level agreements (SLAs) that have been executed with the host and each enterprise, uses information from the SLAs that has been received or shared with the central unit CU-H 305 of the host about permissions, priorities, and allocated resources for each enterprise, arbitrates transmission request between the respective enterprise to minimize interference when (though not limited) both enterprises are operating in the same spectrum and the overlapping coverage region between each cell site. For example, the CU-H 305 may arbitrate uplink and downlink transmission requests between a group of UEs of each enterprise operating in the overlapping coverage region. Other implementations can include supporting traffic that includes at least the URLLC for transmissions by each enterprise with as an example, coordinating allocated resources of an Industrial Internet of Things (IIOT) device operating in an interference region. In embodiments, the CU-H 305 can be configured to support the traffic that of the URLLC for transmissions by each enterprise by any time the IIoT device sends a packet by an immediate transmission of the packet over an allocated resource with a boosted power.

Figure 4:
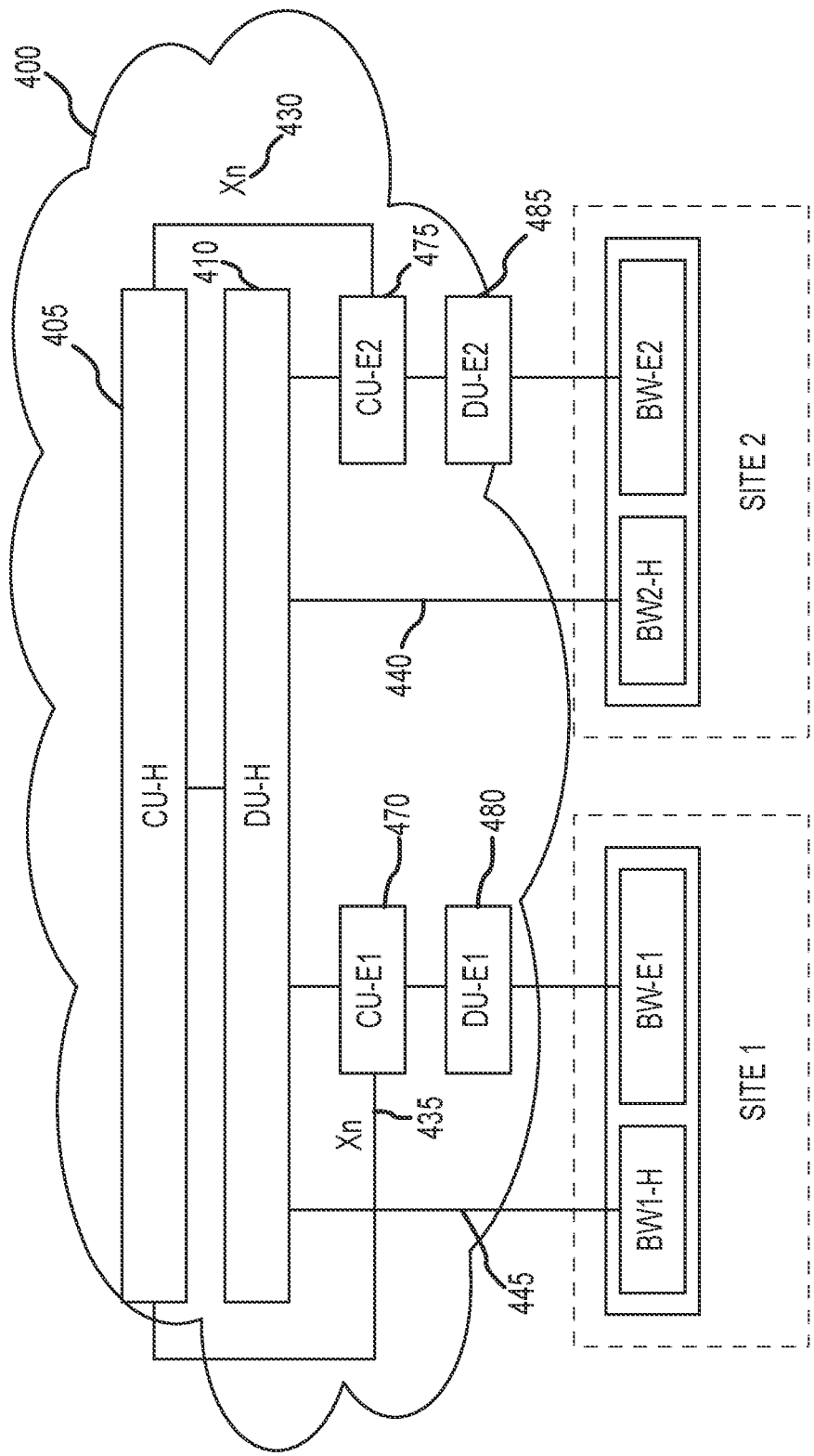
FIG. 4 illustrates an exemplary diagram of another model of the host MNO that offers a different configuration of DUs for radio units (RUs) in different NR cell sites of the interference management system in accordance with various embodiments.

FIG. 4 is an exemplary diagram of another model of the host MNO that offers a different configuration of DUs for radio units (RUs) in different NR cell sites of the interference management system in accordance with various embodiments. In FIG. 4, in the interference management system 400, there is shown a CU-H 405 of the host configured with DU-H 410 of the host with the interface $X_n$ 435 for coupling with the CU-E1 470 of "enterprise 1" where DU-H 410 via connection 445 is shown to control the bandwidth allocated to the host in cell site 1, and DU-E1 480 of "enterprise 1" controls the bandwidth allocated to it. Similarly, in the interference management system 400, there is shown a CU-H 405 of the host configured with DU-H 410 of the host with the interface $X_n$ 430 for coupling with the CU-E2 475 of "enterprise 2" where DU-H 410 via connection 440 is shown to control the bandwidth allocated to the host in cell site 2, and DU-E2 485 of "enterprise 2" controls the bandwidth allocated to it. In this model of the interference management system 400, a single DU-H 410 of the host controls radios (i.e., base station transmitters) of multiple cell sites as opposed to having multiple DUs (i.e., FIGS. 2-3) for controlling radios of multiple cell sites.

Figure 5:
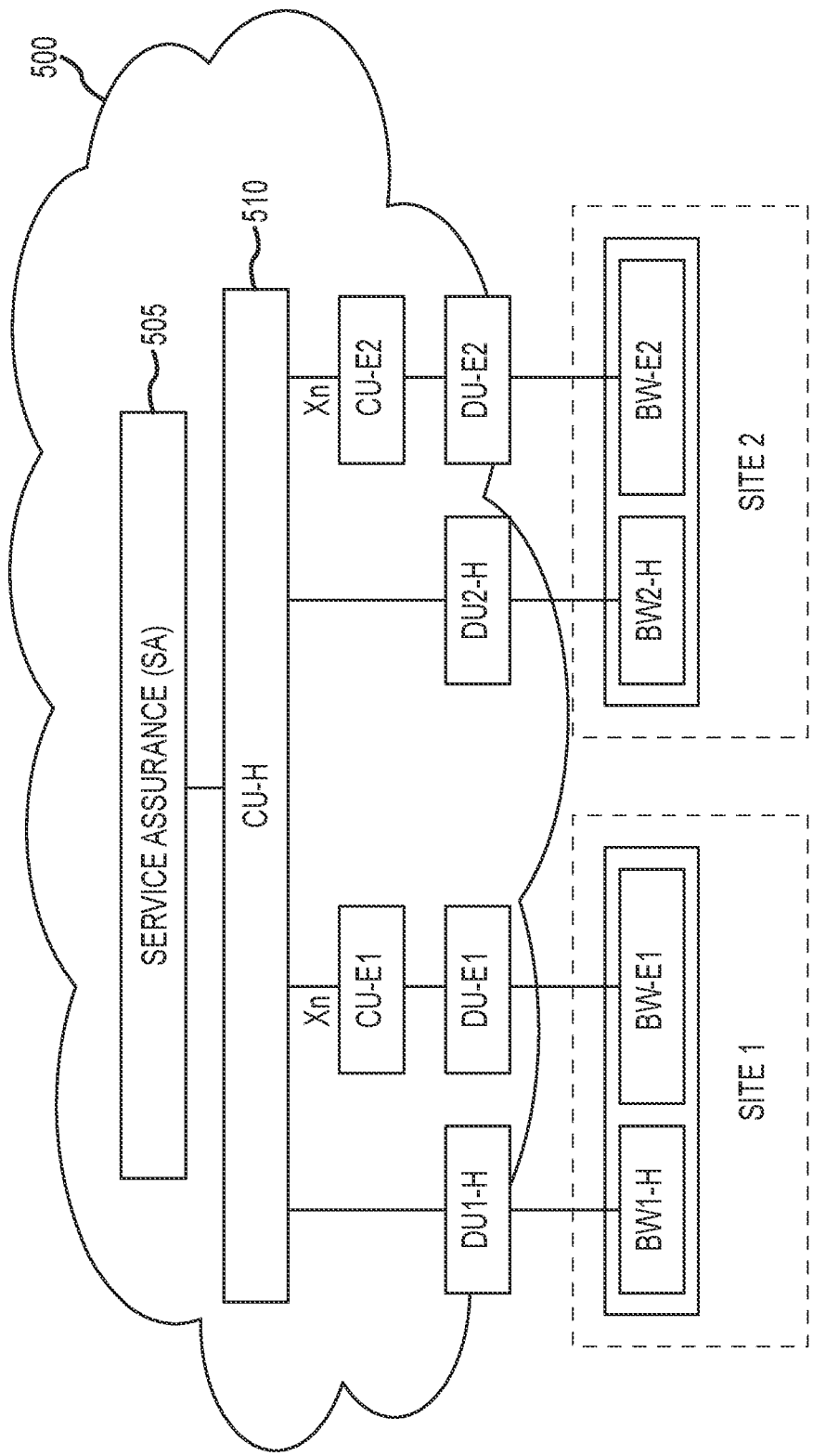
FIG. 5 illustrates an exemplary diagram of a model of the host MNO coupled to a service assurance unit that provides service level agreement (SLA) information to the host to manage the communications of each enterprise by the interference management system in accordance with various embodiments.

FIG. 5 illustrates an exemplary diagram of a model of the host MNO coupled to a service assurance unit that provides service level agreement (SLA) information to the host to manage the communications of each enterprise by the interference management system in accordance with various embodiments. In FIG. 5, there is shown a service assurance (SA) 505 unit coupled to the CU-H 510 of the host of the interference management system 500. In embodiments, the CU-H 510 of the host sends ICIC information to a central Service Assurance (SA) 505 unit that instructs the CU-H 510 of the requirements for arbitrating between transmission requests of the different enterprises associated with different NR cell sites. Also, the CU-H 510 based on the SA 505 information received, is configured to manage the interference of different cell sites and associated enterprise with different ICIC based processes that include controlling coordinating the transmissions and allocation of bandwidths at the cell sites of the enterprises based on changes of "time resources", "frequency resources", and "power" for interference management.

In embodiments, processes for FFR (fractional frequency reuse), IFFR (intelligent FFR), SFR (soft frequency reuse) are implemented for interference management by the CU-H 510 of the host. The SA 505 may implement intelligent algorithms such as artificial intelligence and machine learning algorithms or game theory algorithms to process the ICCI information received and for other analytics of multiple base station radio attributes and transmissions to provide information for use by the CU-H 510 of the host to minimize interference at cell site coverage edges between cell sites and overlapping regions.

In embodiments, with the minimizing of interference of multiple enterprises in the 5G's high bandwidth and low latency, high definition video can be streamed in real-time. As an example, the CU/DU of the host or enterprise may be configured with applications, when the enterprise network is congested where video quality is likely degraded or may be significantly reduced on displays associated with the UEs that the viewing experience is sharply decreased or non-existent to provide smart solutions to still convey necessary information to a user. In this instance, to overcome the diminished video quality, in an exemplary embodiment, the user can be provided with a mechanism (i.e., application) to hand draw, shape, or preselect shapes to create boxes over portions of the video on a graphical user interface (GUI) of the display of a UE type device (e.g., over a box-score in a sports game). The CU/DU of a host or enterprise can be configured to receive the selection information from the UE type device and to analyze the data in the video sent to the UE type device and provide a static image of an event in the selection box for the user to view. The CU/DU of the host or enterprise can be configured to send a static image at a certain frequency (e.g., as a headline scrolls on a newsfeed, the user can match the scroll speed so that all the text is sent and is capable of being viewed on the display).

In an exemplary embodiment, the network of an enterprise detects poor quality video display on a UE type device and analyzes the video stream for any text (e.g., sports score), and in this case, in response to the poor quality video detected, texts the user with the sports score information so the user is made available of the score. The determination to text the user is determined using intelligent algorithms configured with the software of the CU of the host or enterprise.

Figure 6:
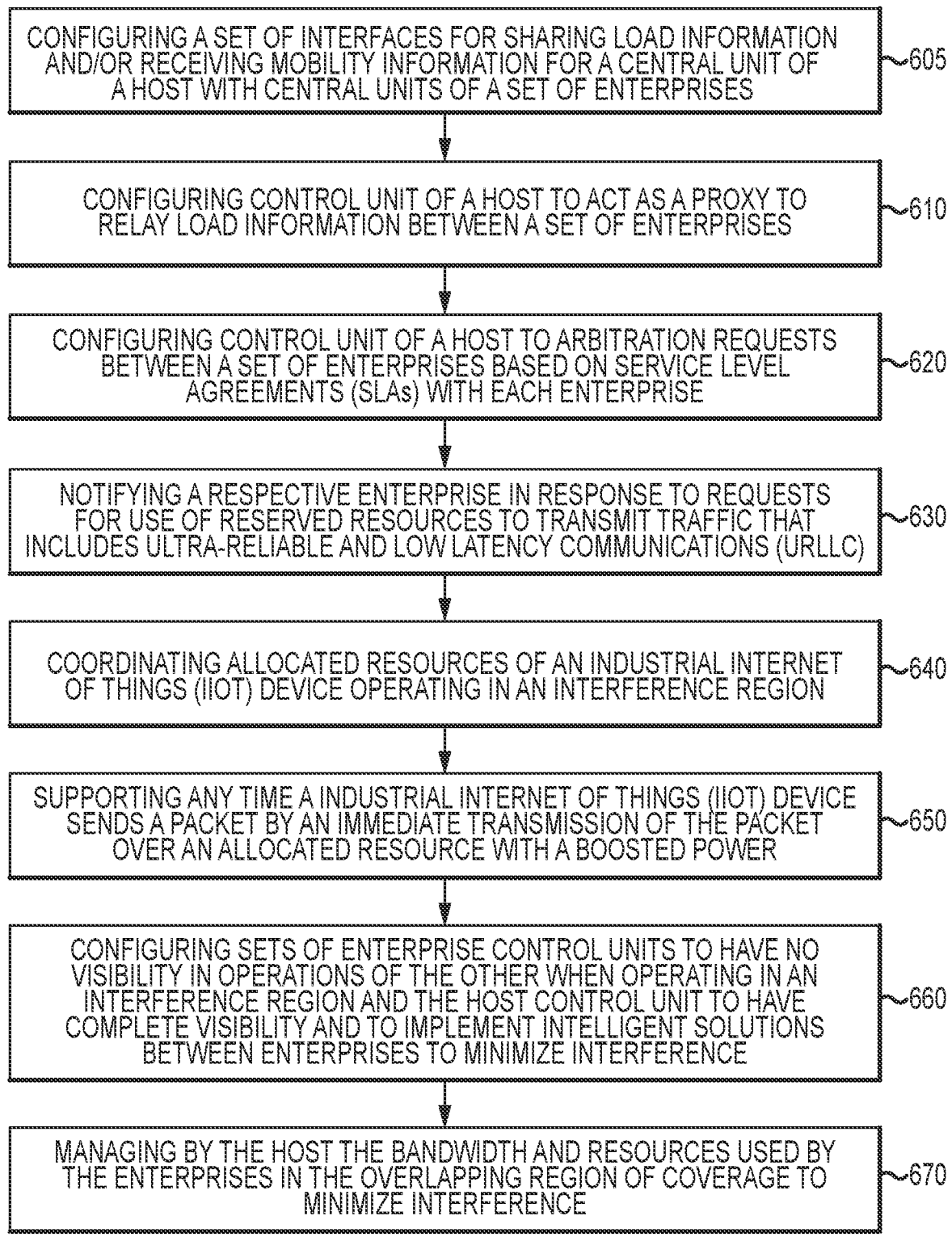
FIG. 6 is an exemplary flowchart of the process for minimizing the interference of neighboring NR cell sites that operating, and at overlapping regions of coverage of the NR cell sites by sharing ICIC information between enterprise central units and host central units by an interference management system in accordance with various embodiments.

FIG. 6 illustrates an exemplary flowchart of the process for minimizing the interference of neighboring NR cell sites that are operating at overlapping regions of coverage of the NR cell sites by sharing ICIC information between enterprise central units via the host central unit by an interference management system in accordance with various embodiments. The flowchart of FIG. 6 corresponds to the exemplary diagram of FIG. 3 where the ICIC (or eICIC) information between enterprises (E1 and E2) is routed or relayed via the central unit CU-H of the host using the $X_n$ interfaces connecting the host to each central unit CU of each enterprise (i.e., central unit CU-E1 of enterprise 1 and central unit CU-E2 of enterprise 2). The enterprises operate independently with no direct linkage and communications transmitted between each other in an interference region between cell sites.

In FIG. 6 at step 605, a set of interfaces is enabled to connect the control units of a set of enterprises (i.e., CU-E1 and CU-E2) and the control unit (CU-H) of the host and configured to transmit load information between each enterprise via the control unit of the host.

At step 610, in a first mode, the control unit (CU-H) of the host is configured to act as a proxy to enable relaying of load information between the first and second enterprises to minimize interference between each enterprise when the first and second enterprises are operating in the same spectrum and in an overlapping coverage region between neighboring cell sites that are associated with either enterprise.

At step 620, in a second mode, the control unit of the host is configured to arbitrate transmission requests from a respective enterprise operating in the overlapping coverage region in the same spectrum based on information from service level agreements (SLAs) shared between the central unit at the host and the respective enterprise to minimize interference when the first and second enterprises are operating in the same spectrum and the overlapping coverage region between each cell site.

At step 630, the central unit of the host is configured to notify via a respective set of interfaces, access that includes grant free access to a dedicated set of UEs of each enterprise subscriber by grant messages at a handover action of a UE of each enterprise subscriber at an NR cell site. The grant free access enables Ultra-Reliable and Low-Latency Communications (URLLC) at the NR cell site for the set of dedicated UEs of each enterprise subscriber.

At step 640, the central unit of the host is configured to support traffic that includes at least the URLLC for transmissions by the first enterprise and the second enterprise by coordinating allocated resources of an Industrial Internet of Things (IIOT) device operating in an interference region. At step 650, the central unit of the host is configured to support traffic that includes at least the URLLC for the transmissions by the first enterprise and the second enterprise any time the IIoT device sends a packet by an immediate transmission of the packet over an allocated resource with a boosted power.

At step 660, the control units of each enterprise are configured not to be directly connected and to have no visibility in transmissions of the other in the interference region, rather the control unit of the host (i.e., the MNO) is configured to have complete visibility to the interference and can implement intelligent algorithms via processors of the host control unit for performance optimization. In embodiments, some standardization may be required or can be implemented for the sharing of ICIC information indirectly through the control unit of the host.

At step 670, the bandwidth used by the group of UEs of either enterprise at the neighboring NR cell site is managed or resources are allocated by the host. Also, the host central unit is configured at the host with multiple interfaces for controlling transmitter power of NR operations in a frequency domain to enable receipt of uplink and downlink transmissions and to prevent interference of communication activities caused by overlapping coverage of neighboring NR cell sites.

Figure 7:
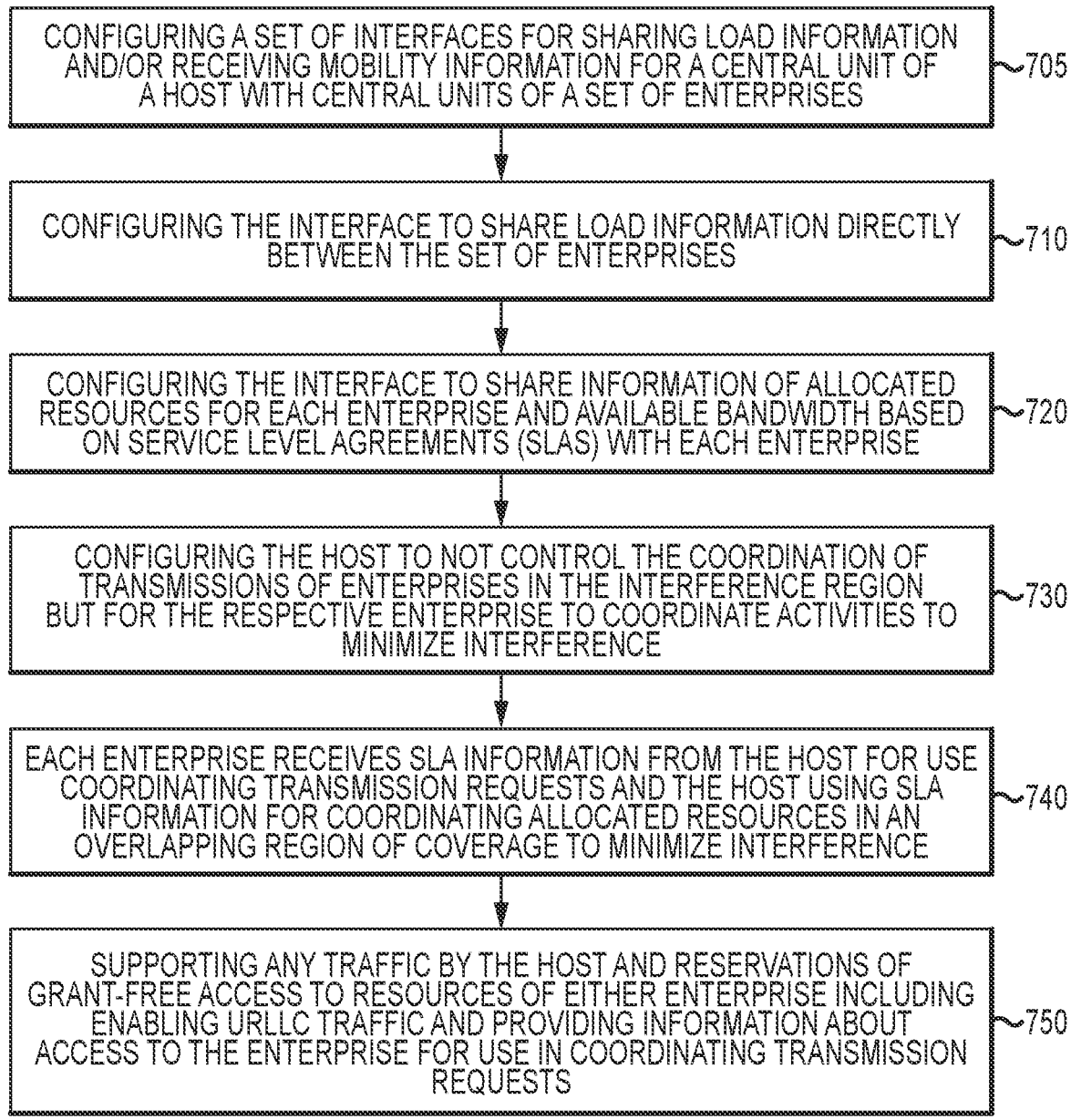
FIG. 7 illustrates an exemplary flowchart of the process for minimizing the interference of neighboring NR cell sites that operating, and at overlapping regions of coverage of the NR cell sites by sharing ICIC information directly between enterprise central units by an interference management system in accordance with various embodiments.

FIG. 7 illustrates an exemplary flowchart of the process for minimizing the interference of neighboring NR cell sites that operating, and at overlapping regions of coverage of the NR cell sites by sharing ICIC information directly between enterprise central units by an interference management system in accordance with various embodiments. The flowchart of FIG. 7 corresponds to the exemplary diagram of FIG. 2 where the ICIC (or eICIC) information between enterprises (E1 and E2) is transmitted directly back and forth via a direct connection of both enterprises. That is the load information is not routed or relayed via the central unit CU-H of the host. The $X_n$ interface coupling both enterprises is configured (used) to transmit load information (rather than mobility information) between each enterprise (i.e., central unit CU-E1 of enterprise 1 and central unit CU-E2 of enterprise 2). Hence, the enterprises do not operate independently and coordinate communications independent of the host to minimize interference in the interference region between cell sites.

In the flowchart of FIG. 7, at step 705, an interface is configured between a set of control units of a pair of enterprises (CU-E1, CU-E2) for establishing a connection between the set of control units. The interface is used by the pair of enterprises to coordinate transmission activity by enabling requests by processors of either control unit of the pair of enterprises to share ICIC or eICIC information from either enterprise CUs when operating in an interference region of neighboring NR cell sites. For example, the control unit CU-E1 of enterprise 1 can exchange load information using the interface $X_n$ that is configured to send and receive load information with the control unit CU-E2 of the other enterprise, enterprise 2, when both enterprises are operating in an interference region and require coordination of communication activities to reduce interference.

At step 710, the interface is configured for both enterprises to receive load information directly and the respective enterprise via another set of interfaces to communicate to the control unit CU-H of the host about the mobility of UEs of either enterprise that is operating in the interference region to coordinate transmission activities to reduce interference.

At step 720, the central units of the enterprises can also be configured for either enterprise via the respective interface to also receive information of allocated resources and available bandwidth from the host control unit when operating in the overlapping regions or at the respective cell site and per SLAs with each enterprise. The base station operations of the respective cell site of each enterprise are managed by the host control unit CU-H.

At step 730, in operation, the host MNO is configured to not control the coordination of transmissions of either enterprise and is limited to an ancillary role to provide mobility information or the like. The operations of either enterprise are independently coordinated by control units of either enterprise. The interface connection between the enterprises is configured to provide direct mobility or handover information between each enterprise and the monitoring function of the mobility or handover information at the cell site still resides with the host control unit.

At step 740, the control units of the respective enterprise synchronize the uplink and downlink transmissions of groups of UEs independently. In an alternate embodiment, each enterprise may receive SLA information from the host control unit to assist in coordinating transmission requests with the other enterprise, or the host control unit may use the SLA information in its possession to allocate resources between enterprises operating in the overlapping coverage region in the same spectrum.

At step 750, the control units of the respective enterprise may receive access information for traffic that includes grant free access to enable Ultra-Reliable and Low-Latency Communications (URLLC) at the NR cell site for a set of dedicated UEs of the enterprise and use the access to coordinate transmissions in interference regions. For example, the URLLC can be supported for both uplink and downlink transmissions by enterprises coordinating communications of allocated non-overlapping grant-free resources of an Industrial Internet of Things (IIoT) device operating in the interference region.

In embodiments, the control unit at the host can manage resources of each cell site such as the bandwidth used by the group of UEs of either enterprise operating in the overlapping region of neighboring NR cell site by the mobility and handoff information received. Also, the central unit is configured at the host for controlling transmitter power of NR operations in a frequency domain to enable receipt of uplink and downlink transmissions of the enterprises and to prevent interference of communication activities caused by overlapping coverage of neighboring NR cell sites.

It should be appreciated that the processes of FIGS. 6-7 may include any number of additional or alternative tasks, the tasks are shown in FIGS. 6-7 need not be performed in the illustrated order and the processes of FIGS. 6-7 may be incorporated into a more comprehensive procedure or process having additional functionality not described in detail herein. Moreover, one or more of the tasks shown in FIGS. 6-7 may be omitted from an embodiment of the process shown in FIGS. 6-7 as long as the intended overall functionality remains intact.

In various exemplary embodiments, the disclosure describes managing and minimizing the interference between different enterprises operating over the same spectrum. As described, interface connections are configured between the central unit of the host and an enterprise for coordinating communication activity of enterprises operating in the same spectrum that enables operating the control unit of the host with functionalities of relaying load information and arbitrating transmission requests between enterprises, and also enabling enterprises to independently between themselves coordinate communications to minimize interference when operating in overlapping regions of cell sites associated with each enterprise and in the same spectrum.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or exemplary embodiments are only examples and are not intended to limit the scope, applicability, or configuration of the disclosure in any way. Rather, the foregoing detailed description will provide those skilled in the art with a convenient road map for implementing the exemplary embodiment or exemplary embodiments.

As described, an interference management system includes several processing components, each of which is patentable, and/or have patentable aspects, or having processing hardware capable of performing automated processes that are patentable. This document is not intended to limit the scope of any claims or inventions in any way, and the various components and aspects of the system described herein may be separately implemented apart from the other aspects.

The invention claimed is:

1. A method of managing interference between different enterprises operating over a same spectrum, comprising:
    establishing a connection between a control unit of a first enterprise and the control unit of a second enterprise via a first interface for coordinating communication activity between each enterprise operating in the same spectrum,
        wherein the first enterprise is associated with a first New Radio (NR) cell site and the second enterprise is associated with a second NR cell site,
        wherein the first NR cell site is neighboring the second NR cell site with an overlapping coverage region between each NR cell site;
    coordinating transmissions between the first and second enterprises based on load information transmitted via the first interface between the first and second enterprises when both the first and second enterprises are operating in an overlapping coverage region of neighboring NR cell sites in the same spectrum; and
    configuring the first interface to enable transmission of only load information between each of the enterprises, wherein transmission of the load information does not require any standard format in order for processing by the control unit of either enterprise,
    configuring a second interface for coupling a central unit at a host to the central unit of the first enterprise, and to the central unit of the second enterprise wherein each enterprise is separately coupled wherein the second interface is configured to transmit mobility information,
        wherein the central unit of each enterprise ensures that any overlap in requests by each enterprise for reserved grant-free resources by each enterprise is minimized.

2. The method of claim 1, further comprising minimizing interference, by the first and second enterprises, based on the load information which is transmitted between both enterprises via the first interface by coordinating transmissions from a group of User Equipment (UE) associated with each of the enterprises operating in the overlapping coverage region of neighboring NR cell sites in accordance with a bandwidth that is allocated to each enterprise.

3. The method of claim 2, further comprising configuring the connection of a Service Assurance (SA) unit coupled to the central unit wherein the SA unit assists in delivery of information from service level agreements (SLAs) with respective enterprises to the central unit of the host.

4. The method of claim 3, further comprising communicating, by the central unit of the host via the second interface, information from the SLA to the central unit of each enterprise to assist each enterprise in coordinating transmissions of a group of UE associated with each enterprise to minimize interference by synchronizing uplink and downlink transmissions of the group of UE that is operating in the same spectrum in the overlapping coverage region.

5. The method of claim 3, further comprising allocating the bandwidth, by the central unit of the host, based on at least information from the SLA with a respective enterprise and the mobility information received via the second interface.

6. The method of claim 5, wherein each dedicated group of UE is notified of use of reserved grant-free resources via grant messages exchanged between each enterprise via the interface.

7. The method of claim 5, wherein grant free access configured with each enterprise enables any type of traffic including Ultra-Reliable and Low-Latency Communications (URLLC) at the NR cell site for the dedicated group of UE of each enterprise.

8. The method of claim 7, further comprising supporting the URLLC for an uplink transmission by the central unit of the first enterprise and by the central unit of the second enterprise by coordinating allocated non-overlapping grant-free resources of an Industrial Internet of Things (IIOT) device operating in an interference region.

9. The method of claim 6, further comprising supporting, by the central unit configured at either enterprise, the URLLC for the uplink transmission by the first enterprise and the second enterprise any time the IIOT device sends a packet by immediately transmitting the packet over an allocated grant-free resource with a boosted power.

10. The method of claim 9, wherein each enterprise central unit is connected to a set of distributed units to manage requests from the group of UE operating on parts of the bandwidth in the same spectrum which is allocated to either enterprise of neighboring NR cell sites, and wherein the bandwidth used by the group of UE of either enterprise at the neighboring NR cell site is managed by the load information received by a host central unit.

11. A system for managing interference between different enterprises operating over a same spectrum, comprising:
 a central unit of a first enterprise associated with a first cell site;
 a central unit of a second enterprise associated with a second cell site; and
 an interface for connecting the central unit of the first enterprise to the central unit of the second enterprise and configured to transmit load information,
  wherein a central unit of either enterprise is configured to share load information without requiring a standard form between each enterprise via the interface to minimize interference between each enterprise when both enterprises are operating in the same spectrum and in an overlapping coverage region between each cell site,
 wherein the central unit of each enterprise is configured to coordinate uplink and downlink transmission requests between a group of User Equipment (UE) of each enterprise operating in the overlapping coverage region between each cell site to reduce frequency interference that occurs in the same spectrum.

12. The system of claim 11, wherein the central unit of each enterprise unit is configured to coordinate requests between each enterprise based on requirements received from a Service Assurance (SA) unit coupled to the central unit of a host in communication with each enterprise wherein the SA unit assists in delivery of service-level agreements (SLAs) to the central unit of the host.

13. The system of claim 12, wherein the central unit of each enterprise is configured to support traffic that includes at least URLLC for transmissions by the first enterprise and the second enterprise with allocated resources of an Industrial Internet of Things (IIOT) device when operating in an interference region.

14. The system of claim 13, wherein the central unit of each enterprise is configured to support traffic that includes at least the URLLC for an uplink transmission only by the first enterprise and the second enterprise any time the IIoT device sends a packet by an immediate transmission of the packet over the allocated resource with a boosted power.

15. The system of claim 14, wherein the central unit of each enterprise is connected to a respective distributed unit for controlling the group of UE operating on a bandwidth in the same spectrum which is allocated to either enterprise at a new radio (NR) cell site wherein the bandwidth used by the group of UE of either enterprise at the NR cell site is managed by the central unit of the host.

16. A system synchronizing radio transmissions of enterprises of neighboring cell sites operating in a same spectrum to minimize interference between the enterprises, comprising:
 a central unit configured at a host that manages resources of multiple cell sites;
 a first central unit configured at a first enterprise network;
 a second central unit configured at a second enterprise network; and
 a pair of interfaces comprising a first interface configured to connect directly together central units of each enterprise, and a second interface configured to connect the central unit of the host to the central unit of each enterprise,
 wherein the first interface is only configured to share load information between the central unit of each enterprise that is used to minimize interference of transmissions between enterprises operating in the same spectrum and an interference region,
 wherein the central unit of each enterprise is configured to coordinate requests between each enterprise based on requirements received from a Service Assurance (SA) unit coupled to the central unit of the host in communication with each enterprise, and
 wherein the SA unit assists in delivery of SLAs to the central unit of the host.

* * * * *